(12) United States Patent
Daughtry et al.

(10) Patent No.: US 6,438,686 B1
(45) Date of Patent: Aug. 20, 2002

(54) METHOD AND APPARATUS FOR ELIMINATING CONTENTION WITH DUAL BUS MASTERS

(75) Inventors: Gregory M. Daughtry; Hieu T. Tran; Srithar Ramesh, all of Portland; Andrew J. McRonald, Beaverton, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/296,195

(22) Filed: Apr. 20, 1999

(51) Int. Cl.[7] .............................................. G06F 15/177
(52) U.S. Cl. ................... 713/1; 710/2; 710/8; 710/300; 710/104
(58) Field of Search ...................... 710/2, 8, 10, 15–19, 710/46, 100, 101, 104, 107, 300; 713/1, 100, 600

(56) References Cited

U.S. PATENT DOCUMENTS

| 5,109,506 A | * | 4/1992 | Begun .......................... 714/23 |
| 5,276,864 A | * | 1/1994 | Hernandez et al. ........... 714/10 |
| 5,485,585 A | * | 1/1996 | Huynh et al. ................ 710/131 |
| 5,848,250 A | * | 12/1998 | Smith et al. ................. 710/129 |
| 5,884,091 A | * | 3/1999 | Ghori et al. ................... 712/32 |
| 6,079,027 A | * | 6/2000 | Lai et al. ..................... 713/501 |
| 6,138,193 A | * | 10/2000 | Dalton et al. ................ 710/102 |
| 6,185,694 B1 | * | 2/2001 | Daughtry ..................... 713/601 |
| 6,237,103 B1 | * | 5/2001 | Lam et al. ................... 713/330 |
| 6,292,859 B1 | * | 9/2001 | Santiago ...................... 710/107 |
| 2001/0018721 A1 | * | 8/2001 | McKenna et al. ........... 710/126 |

FOREIGN PATENT DOCUMENTS

EP 0657826 A1 * 6/1995 ........... G06F/15/16

* cited by examiner

Primary Examiner—Xuan M. Thai
(74) Attorney, Agent, or Firm—Jeffrey S. Draeger (57) ABSTRACT

A method and apparatus for eliminating contention with dual masters. One method disclosed disables a default bus master, and tests for a second bus master. If the second bus master fails to respond, the default bus master is enabled.

23 Claims, 5 Drawing Sheets

METHOD AND APPARATUS FOR ELIMINATING CONTENTION WITH DUAL BUS MASTERS

BACKGROUND

1. Field of the Invention

The present invention pertains to the field of computer systems. More particularly, the present invention pertains to avoiding contention of multiple devices on a bus.

2. Description of Related Art

Many bus masters in current computer systems are configured automatically by the computer system itself. For example, particular interrupt values and address ranges are typically assigned to peripheral devices, and these peripheral devices may not respond until accessed by the system. Such system self-configuration often avoids bus contention.

Nonetheless, some bus masters may expect to have control of a certain bus or a certain resource upon normal system initialization. As a result, bus contention may be caused if an additional bus master that also expects to have control of the same resource is added in a system to provide increased throughput or to otherwise upgrade the system. The capability to automatically disable one of two contending bus masters might advantageously simplify user upgrades and system manufacturer reconfigurations.

One prior art example of a bus master that may expect control of a system bus is a microprocessor. Some prior art systems allow a second microprocessor to be plugged in to an upgrade slot. In order to avoid contention between the two processors, this system continuously asserts an "upgrade present" signal to prevent the original processor from driving the bus. This approach requires a dedicated pin and a pre-defined special mode entered when the upgrade present signal is asserted.

Another example of a component that may expect to be a bus master without any initial configuration is an accelerated graphics port (A.G.P.) bus master. Typically, the A.G.P. bus is a two load bus, hosting an A.G.P. bus master and a bus controller. The bus controller may be a "north bridge" also coupled to the system processor and memory. Further details regarding the A.G.P. bus may be found in the Accelerated Graphics Port Specification, Version 2.0, May 4, 1998, which is available from the Accelerated Graphics Port Implementers Forum on the Internet at http://www.agpforum.org as of the time of filing of this application.

One prior art system includes a three load A.G.P. bus. In this system, an on-board A.G.P. bus master is provided on a computer system motherboard in addition to the north bridge. A connector that is coupled to the A.G.P. bus is also provided for adding an upgraded A.G.P. bus master on an add-in card. In order to perform an upgrade, however, a jumper block on the motherboard is used to manually disable the on-board A.G.P. master and to enable the add-in card master by routing the FRAME# signal only to the selected A.G.P. master.

Thus, the prior art may fail to provide an automatic software configurable design for a three load A.G.P. system. Such a system may be advantageous in simplifying user and reseller system reconfigurations. Moreover, the prior art may fail to provide a generalized system that avoids bus contention by disabling a default bus master to test for an alternate bus master and/or by sequencing through system reset more than once

SUMMARY

A method and apparatus for eliminating contention with dual masters is disclosed. One method disclosed disables a default bus master, and tests for a second bus master. If the second bus master fails to respond, the default bus master is enabled.

BRIEF DESCRIPTION OF THE FIGURES

The present invention is illustrated by way of example and not limitation in the figures of the accompanying drawings.

DETAILED DESCRIPTION

The following description provides a method and apparatus for eliminating contention with dual bus masters. In the following description, numerous specific details such as bus architectures, bus master types, and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement the necessary logic circuits without undue experimentation.

Some disclosed embodiments may provide a conveniently upgraded or reconfigured system. The system may be an automatically configured three load A.G.P. system and may avoid contention between bus masters during configuration. Such a system may control configuration via basic input/output (BIOS) routines and may advantageously use only two system level general purpose outputs (GPOs).

Figure 1:
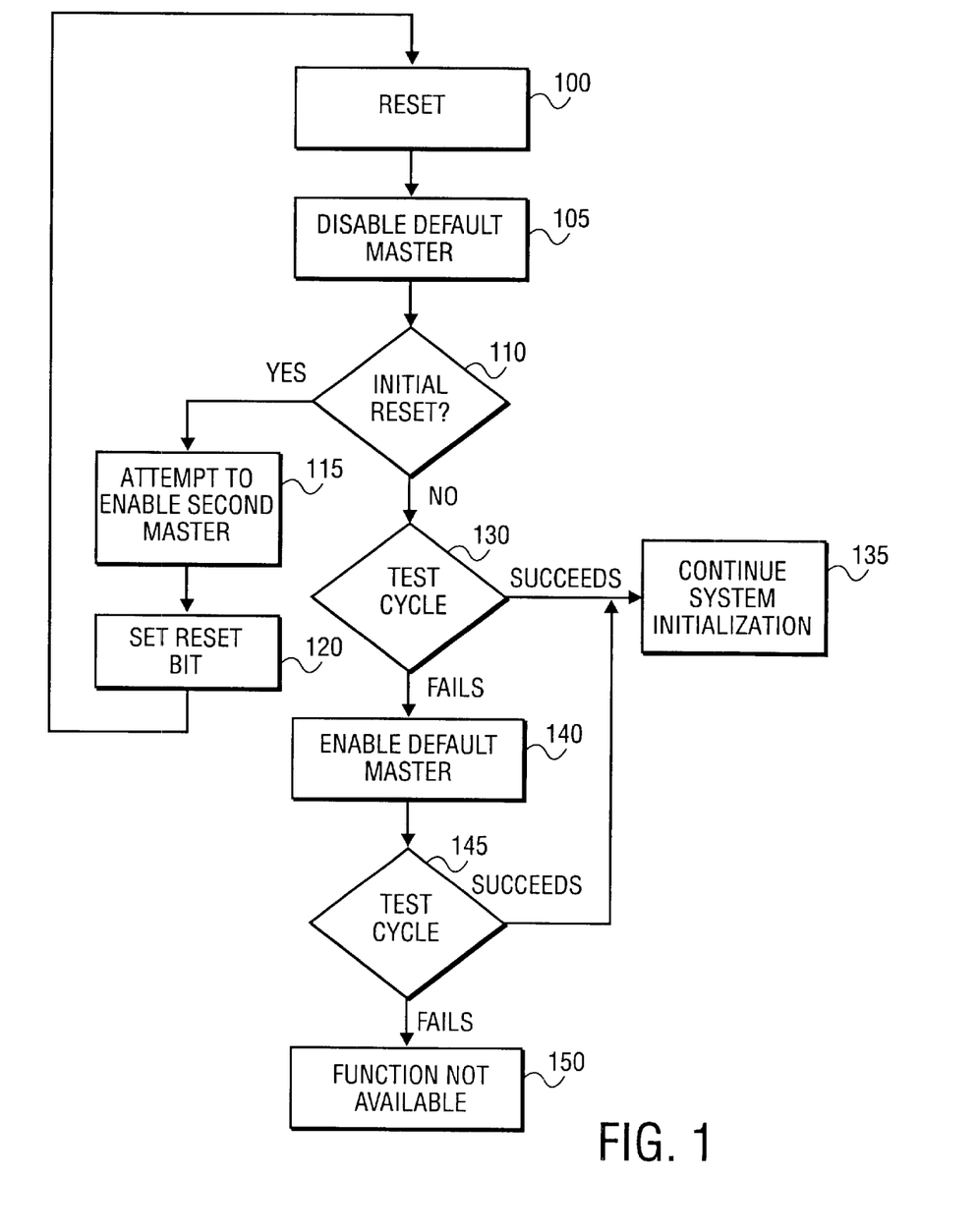
FIG. 1 illustrates one embodiment of a flow diagram for avoiding bus contention in a system capable of supporting multiple bus masters on a bus.

FIG. 1 illustrates one embodiment of a flow diagram for avoiding bus contention in a system capable of supporting multiple bus masters which each expect to have ownership of the bus. If steps such as those shown in FIG. 1 are taken, such multiple bus masters may avoid simultaneously driving the bus and may avoid both responding to bus cycles only intended for one of the bus masters. According to the process of FIG. 1, the default bus master is disabled when a second bus master (e.g., an upgrade) is present. In block 100, the system is reset or otherwise initialized. In block 105, a default bus master is disabled to avoid contention with the second bus master if it is present.

In block 110, the system tests a reset indicator to determine whether the reset is an initial reset or a subsequent reset. If the reset is an initial reset, the system attempts to enable the second bus master as indicated in block 115. Since the default bus master was disabled in block 105, there should be no contention between the default bus master and the second bus master if and when the second bus master begins bus activity. The second bus master may be enabled at this point by steering a clock signal to the second bus master, by sending a particular signal or set of signals to the second bus master, and/or by other techniques which allow the second bus master to operate.

Thereafter, the reset indicator (e.g.,: a reset bit) is set to indicate that the next reset is not an initial reset as shown in block 120. This bit or indicator needs to be stored in a manner or location such that the value is preserved during a system reset. In some embodiments, a non-volatile memory cell may be used. Accordingly, after the system is reset (block 100) and the indicator is again tested in block 110, the indicator indicates that the reset occurring was not an initial reset.

In block 130, a test cycle is executed. This test cycle may be a configuration cycle or another cycle that causes the second bus master (if present) to respond. If the test succeeds, and the second bus master responds, the second bus master remains activated, the default bus master remains disabled, and system initialization continues as indicated in block 135.

If the test cycle fails, the second master is not present and/or functioning, so the default master is enabled as indicated in block 140. As in the case of enabling the second bus master, the default bus master may be enabled by steering a clock signal to the default bus master and/or other techniques. The enabling and disabling of these bus masters, however, is performed without manual intervention (e.g., changing a jumper) as was done in the prior art.

Another test cycle is performed as indicated in block 145. If this test cycle succeeds, the default bus master remains enabled, and system initialization continues in block 135. If the default bus master does not respond, then neither the default bus master nor the second bus master are present and/or functioning. Therefore, the function implemented by these bus masters is not available as indicated in block 150, and may be disabled.

Figure 2:
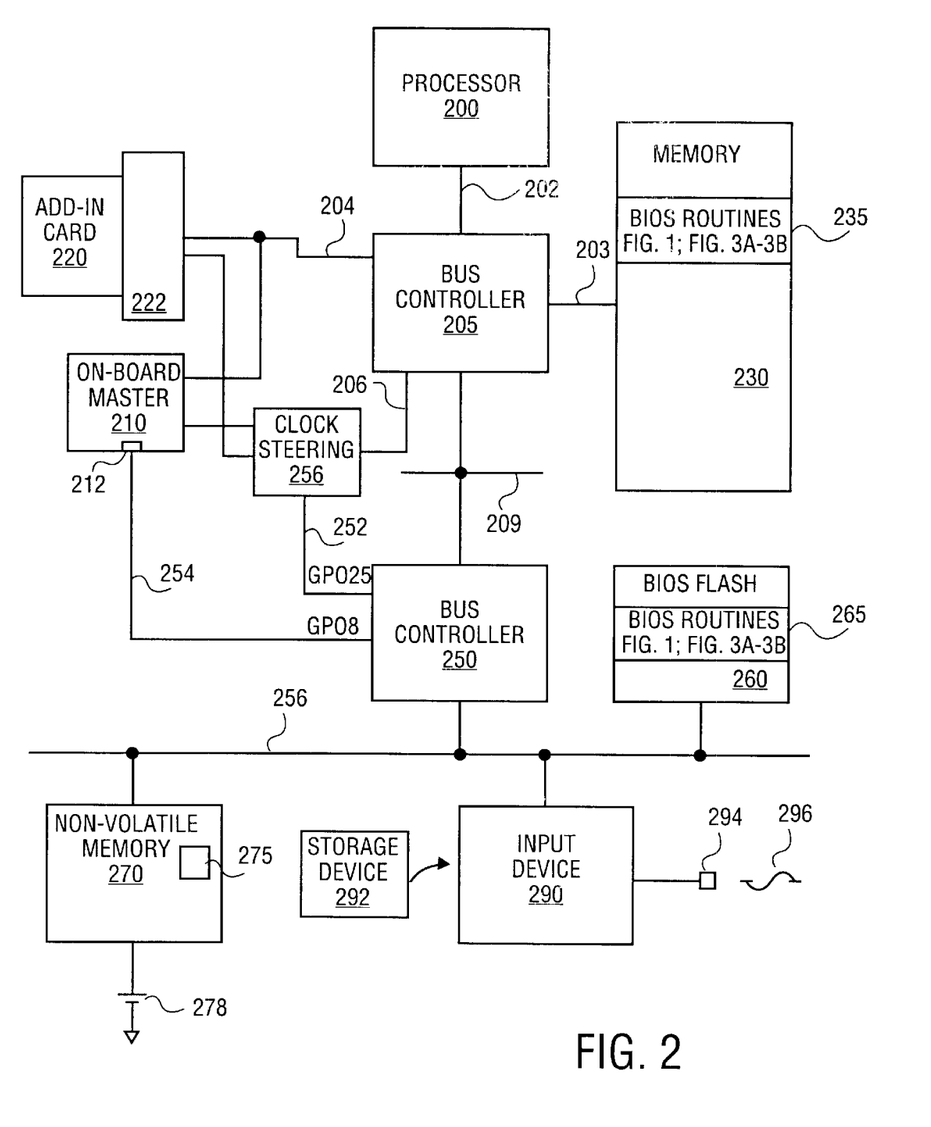
FIG. 2 illustrates one embodiment of a system that reduces contention between multiple bus masters.
Figure 3A:
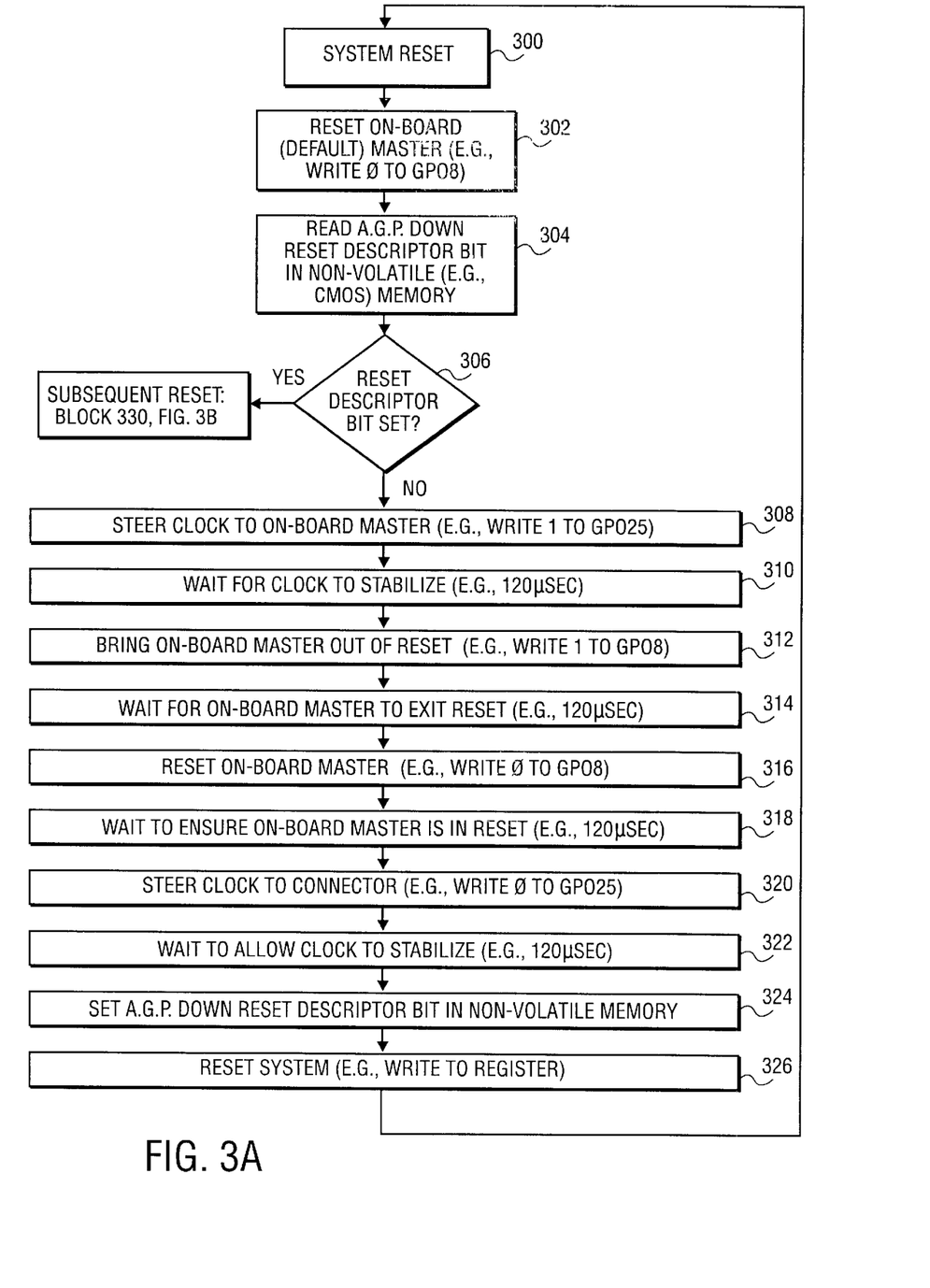
FIGS. 3A–3B illustrate a detailed flow diagram for one embodiment of the system of FIG. 2.
Figure 3B:
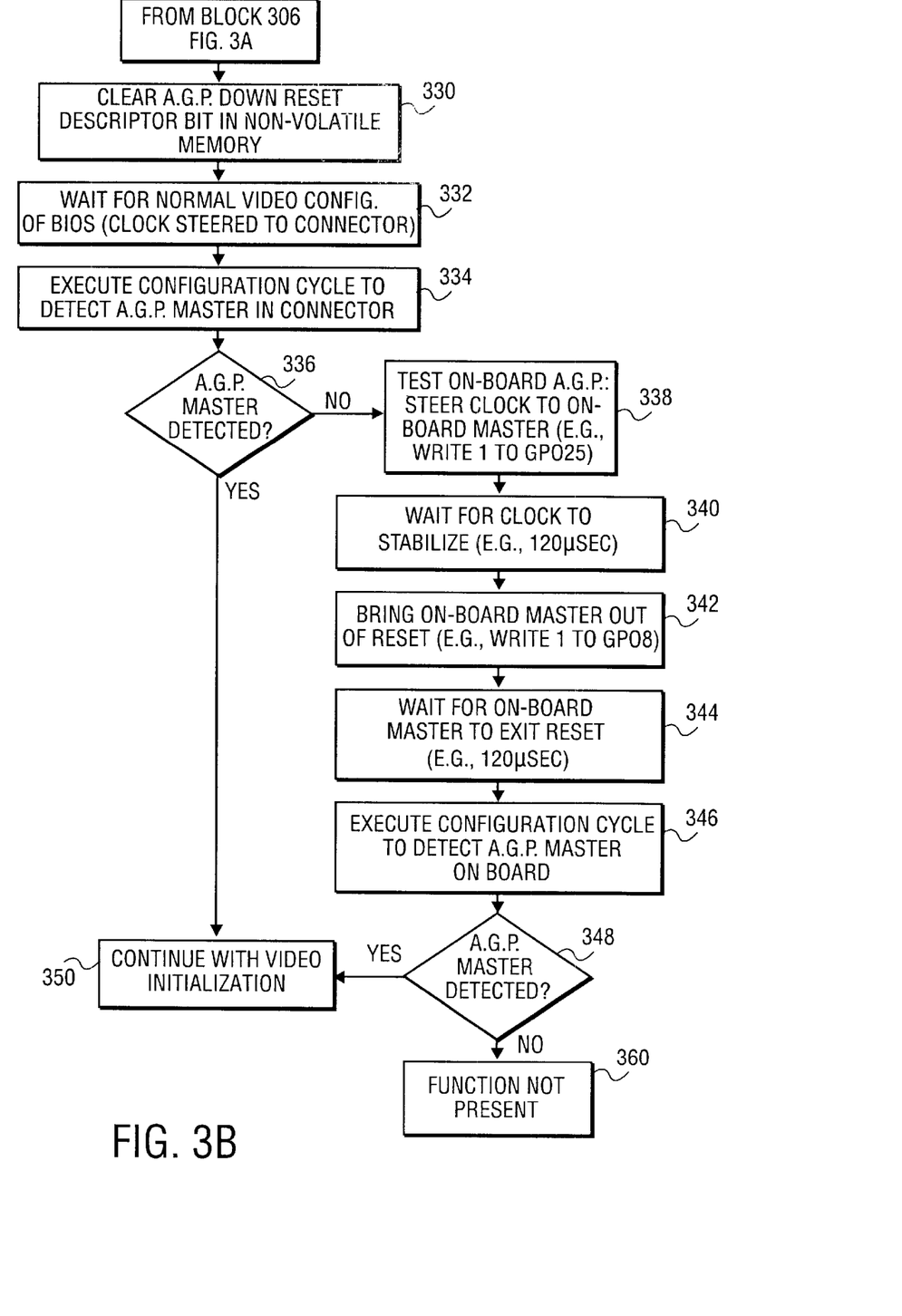

FIG. 2 illustrates one system which may employ the techniques generally described with respect to FIG. 1. A more detailed flow diagram of operation of one embodiment of the system of FIG. 2 is shown in FIGS. 3A and 3B. The system includes a bus controller 205 which is coupled by a bus 202 to a processor 200, by a bus 203 to a memory 230, by a bus 204 to a connector 222 and an on-board master 210, and to a bus 209.

A second bus controller 250 is coupled to the bus controller 205, to the bus 209, and to a bus 256. The bus 256 also may have coupled thereto a non-volatile memory to store Basic Input/Output System (BIOS) code. In the illustrated embodiment, a flash memory device 260 stores BIOS which may implement a number of the operations from FIGS. 1, 3A, and 3B as indicated by the BIOS routines 265 stored in the flash memory device 260. The BIOS routines, or portions thereof, may be copied to main memory 230 as indicated by the routines 235 in the memory 230.

The BIOS may be updated or upgraded via an input device 290. For example, the input device 290 may load computer program instructions from any known or available computer instruction storage or transmission medium (a computer readable medium). In the embodiment illustrated in FIG. 2, the input device 290 may accept program instructions from a computer storage device 292 (e.g., an optical or magnetic disk or other storage device). In this case, a tangible carrier is the computer readable medium.

The BIOS may also be updated via a network or communications interface 294. In this case, a carrier wave 296 carrying the computer instruction is the computer readable medium. The carrier wave 296 may be modulated or otherwise manipulated to contain instructions that can be decoded by the input device 290 using known or otherwise available communication techniques. For example, an upgraded or later version of the BIOS may be transmitted over the Internet.

The bus 256 may also have coupled thereto a non-volatile memory 270 which may be backed-up by a battery 278. The non-volatile memory 270 includes a location 275 for storing an A.G.P. reset descriptor bit as will be further discussed below. In other embodiments, the non-volatile memory may be any memory that can maintain a value for the A.G.P. reset descriptor bit through a system reset.

The bus controller 250 may have general purpose outputs (GPOs) that can be used to implement system functions. The general purpose outputs may maintain their states through a reset or may themselves also be reset. In the illustrated embodiment, a GPO25 signal line 252 driven by the bus controller 250 is coupled to a clock steering circuit, and a GPO8 signal line driven by the bus controller 250 is coupled to a reset input 212 of the on-board master. At least GPO25 maintains its output through reset. In other embodiments, these signals may be driven by general purpose or dedicated outputs of other system components.

Turning to FIG. 3A, the operations of one embodiment of this system are described. In block 300, a system reset occurs. Typically, when such a system reset occurs, a the clock signal on clock signal line 206 is steered to the connector 222. In response to this reset, the BIOS code disables the on-board bus master 210 as indicated in block 302. This may be accomplished by asserting (writing a logical zero) on the GPO8 signal line 254 to assert the reset signal of the bus master 210.

Next, as indicated in block 304, the BIOS code may read the A.G.P. down reset descriptor bit stored in non-volatile memory. This may be accomplished by reading the location 275 in the non-volatile memory 270 of FIG. 2. In some embodiments, this non-volatile memory may be the system battery-backed-up random access memory. If the reset descriptor bit is not set as tested in block 306, the reset is an initial reset, and the initialization sequence proceeds to block 308.

Figure 4:
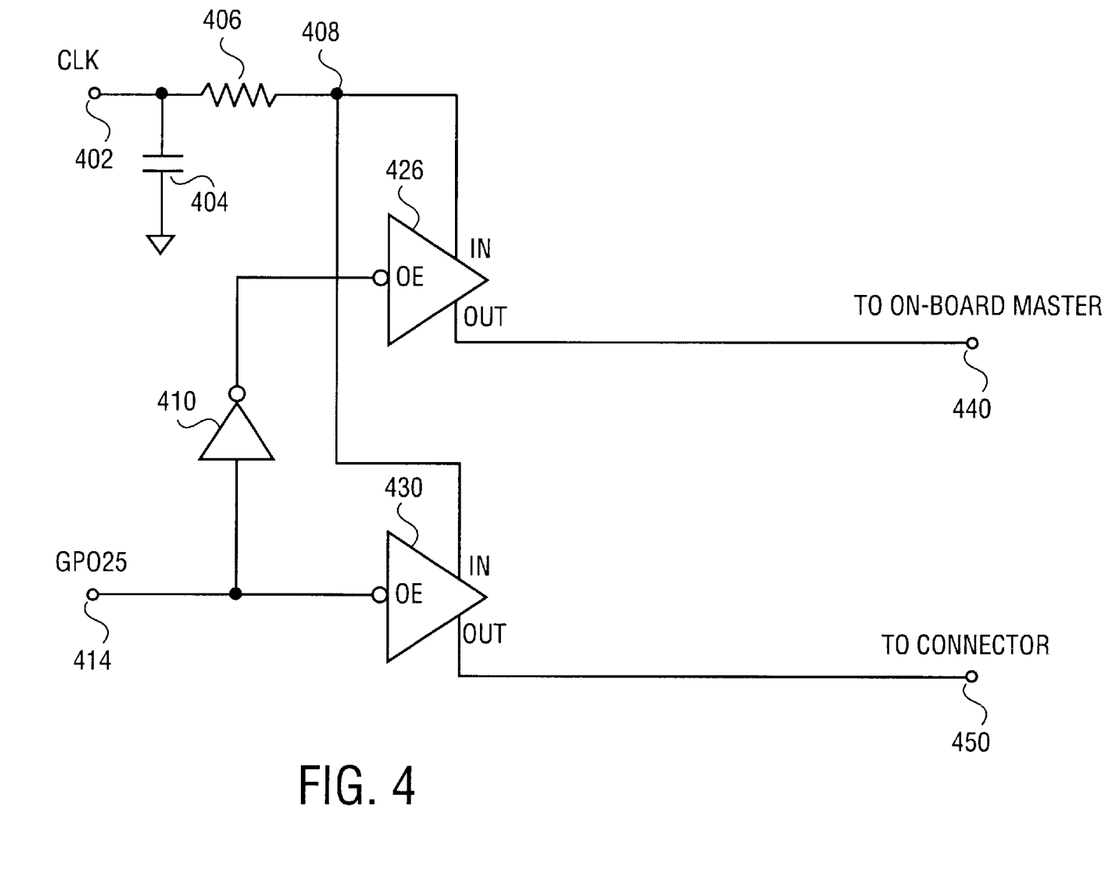
FIG. 4 illustrates one embodiment of a clock steering circuit that may be used with the system of FIG. 2.

As indicated by block 308, a clock signal may be steered to the on-board bus master. In the embodiment of FIG. 2, the bus controller 250 may write a logical one on the GPO25 signal line 252, causing a clock steering circuit 256 to direct the clock signal on a clock signal line 206 to an add-in card 220 (if present) in the connector 222. The clock steering circuit 256 may direct the clock signal from the bus controller 205 to only one of the connector 222 and the on-board bus master 210 at a time in order to limit the load driven by the clock circuitry in the bus controller 205. This may advantageously allow the integration of a more compact set of clock and driver circuits into the bus controller 205 than might be used if the clock was driven to both devices. One example of the clock steering circuit 256 is shown in FIG. 4. In one embodiment, the GPO25 signal line is connected to a node 414 that is connected to an output enable (OE) of a first switch 430. The node 414 is also connected to the output enable (OE) of a second switch 420 by an inverter 410. Thus, one of the two switches is enabled, and the CLK signal from node 402 passes to one of node 440 (to the on-board master) or node 450 (to the connector). In one embodiment, the switches are SN74CBT3306 Dual Field Effect Transistor (FET) Bus Switches available from Texas Instruments of Dallas Texas. Additionally, a capacitor 404 may be coupled between node 402 and ground, and a resistor 406 may be coupled between node 402 and node 408 (the input to both switches 420 and 430). Additional resistance and capacitance may be added (e.g., at nodes 440 and 450) according to the specifics of a system.

After the clock signal is steered to the connector 222, the BIOS code may wait for the clock to stabilize as indicated in block 310. For example, the system may wait one hundred and twenty microseconds in one embodiment. Next, as indicated in block 312, the on-board master may be brought out of reset. In one embodiment, this may be accomplished by writing a logical one to the GPO8 signal line 254, thereby deasserting the reset input 212 of the on-board bus master 210.

Next, the BIOS code may wait for the on-board bus master 210 to exit reset as 20 indicated in block 314. In one embodiment, the BIOS code may wait one hundred and twenty microseconds. The clock is steered to the on-board master and the on-board master is brought out of reset (blocks 308–314) to assure that the on-board bus master can be placed in a known state. As indicated in block 316, the on-board bus master is then put back into the reset state by writing a zero to the GPO8 signal line. To ensure that the on-board bus master 210 is put into the reset state, another one hundred and twenty microseconds. are allowed to pass (as indicated in block 318).

Next, the clock is steered to the connector as indicated in block 320. This may be accomplished in one embodiment by writing a logical zero to the GPO25 signal line. The BIOS then again waits (in one embodiment, one hundred and twenty microseconds) for the clock to stabilize as indicated in block 322. The BIOS sets the A.G.P. down reset descriptor bit in non-volatile memory as indicated in block 324. This may be accomplished by writing to the location 275 in the non-volatile memory 270. The system is then reset, as indicated in block 326. The reset may be accomplished by writing to a register in the bus controller 250 (e.g., register CF9h in one embodiment).

Upon returning to block 300, the system proceeds as previously described until reaching block 306. Since the A.G.P. down reset descriptor bit was set in block 324, the BIOS proceeds to block 330 in FIG. 3B. In block 330, the A.G.P. down reset descriptor bit is cleared. Next, initialization continues until the normal video configuration portion of the BIOS is reached as indicated in block 332. Since the GPO25 is an output that maintains its state through reset, the clock remains steered to the connector 222. Since the GPO8 is an output. that maintains its state through reset, the on-board bus master 210 remains in reset.

Thus, when a configuration cycle is executed, as indicated in block 334, it is directed to the add-in card 220. If an A.G.P. master is detected (as tested in block 336), the add-in card A.G.P. master remains activated, and initialization continues as indicated in block 350. Thus, the A.G.P. master on the add-in card 220 is preferred if it is present; however, this order of preference could be reversed if so desired.

If an add-in card with an A.G.P. master is not detected, the system resorts to the default on-board bus master 210 if it is present. Thus, if no A.G.P. master is detected in block 336, then the on-board A.G.P. facilities are tested starting in block 338. In block 338, the clock is steered back to the on-board bus master. This may be accomplished by writing a logical one to the GPO25 signal line to cause the clock steering circuit 256 to redirect the clock back to the on-board bus master 210. The BIOS may then wait for the clock to stabilize as indicated in block 340. In one embodiment, the wait may be one hundred and twenty microseconds.

Next, the on-board bus master is brought out of reset as indicated in block 342. This may be accomplished by writing a logical one to the GPO8 signal line. Thereafter, a delay (one hundred and twenty microseconds in one embodiment) is allowed for the on-board master to exit reset as indicated in block 344. A configuration cycle is executed to detect whether an on-board A.G.P. device is available and functioning as indicated in block 346. If the A.G.P. master is detected (as tested in block 348), the on-board A.G.P. device remains enabled, and initialization continues as indicated in block 350. If the A.G.P. device is not detected, the A.G.P. functionality is not present and operational in the system, as indicated in block 360.

Thus, a method and apparatus for eliminating contention with dual bus masters is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method comprising:
    disabling a default bus master;
    testing for a second bus master by cycling through an initial reset and a subsequent reset, wherein an attempt to enable the second bus master is made after the initial reset; and
    if said second bus master fails to respond after the subsequent reset, then enabling the default bus master.

2. The method of claim 1 wherein disabling the default bus master comprises steering a clock signal to the second bus master rather than the default bus master.

3. The method of claim 2 wherein enabling the default bus master comprises steering the clock signal back to the default bus master rather than the second bus master.

4. The method of claim 1 wherein said default bus master is an on-board accelerated graphics port controller and wherein said second bus master is an add-in card accelerated graphics port controller.

5. The method of claim 1 wherein disabling the default bus master comprises:
    asserting a reset input of the default bus master.

6. The method of claim 3 wherein testing for the second bus master comprises:
    attempting to enable the second bus master;
    asserting a system reset signal;
    detecting whether a configuration cycle to the second bus master completes successfully.

7. The method of claim 6 wherein attempting to enable the second bus master comprises:
    steering a clock to the second bus master.

8. The method of claim 7 wherein attempting to enable the second bus master further comprises:
    waiting at least a predetermined duration for the clock to settle after the clock has been steered to the second bus master and prior to executing the configuration cycle.

9. A method comprising:
    disabling a default bus master;
    testing an initial reset indicator;
    if the initial reset indicator indicates an initial reset, then:
        attempting to enable a second bus master;
        changing the initial reset indicator to indicate a subsequent reset;
        causing the subsequent reset to occur;
    if the initial reset indicator indicates a subsequent reset, then:
        changing the initial reset indicator to indicate an initial reset; and
        detecting whether the secondary bus master is present;

if the secondary bus master is not present, then enabling the default bus master.

10. The method of claim 9 wherein disabling the default bus master comprises asserting a reset signal for the default bus master.

11. The method of claim 9 wherein attempting to enable a second bus master comprises:
   steering a clock to the second bus master;
   setting a reset bit in a non-volatile memory;
   causing a system reset.

12. The method of claim 11 wherein enabling the default bus master comprises steering a clock back to the default bus master.

13. A system comprising:
   a processor;
   a memory;
   a controller coupled to the processor and the memory;
   a default bus master coupled to the controller by a bus;
   a connector coupled to the bus; and
   a memory device containing a program which, if executed by the processor, causes the system to perform:
      disabling the default bus master;
      testing for a second bus master coupled to the connector by cycling through an initial reset and a subsequent reset, wherein an attempt to enable the second bus master is made before the subsequent reset; and
      if said second bus master fails to respond after the second reset, then enabling the default bus master.

14. The system of claim 13 wherein disabling the default bus master comprises steering a clock to the connector.

15. The system of claim 14 wherein enabling the default bus master comprises steering the clock back to the default bus master.

16. The system of claim 15 further comprising:
   a clock steering circuit coupled to receive the clock signal from the controller and coupled to receive a general purpose output signal which determines whether to provide the clock signal to one of the connector and the default bus master; and
   a second controller coupled to said controller and coupled to generate said general purpose output signal.

17. The system of claim 13 wherein the default bus master is an accelerated graphics port controller on a system motherboard and wherein the connector is an accelerated graphics port connector.

18. The system of claim 13 wherein the memory device is a flash memory and wherein the program is a basic input/output system (BIOS) program.

19. A system comprising:
   a processor;
   a memory;
   a controller coupled to the processor and the memory;
   a default bus master coupled to the controller by a bus;
   a connector coupled to the bus, wherein the system is to perform:
      testing an initial reset indicator;
      if the initial reset indicator indicates an initial reset, then:
         attempting to enable a second bus master;
         changing the initial reset indicator to indicate a subsequent reset;
         causing the subsequent reset to occur.

20. The system of claim 19 wherein the system is further to perform:
   attempting to enable the second bus master;
   asserting a system reset signal;
   detecting whether a configuration cycle to the second bus master completes successfully.

21. An article comprising:
   a machine readable medium storing a program which, if executed by a machine, causes the machine to perform:
      disabling a default bus master;
      testing an initial reset indicator;
      if the initial reset indicator indicates an initial reset, then:
         attempting to enable a second bus master;
         changing the initial reset indicator to indicate a subsequent reset;
         causing the subsequent reset to occur;
      if said second bus master fails to respond, then enabling the default bus master.

22. The article of claim 21 wherein disabling the default master and enabling the default master comprise steering a clock signal.

23. The article of claim 21 wherein the program, if executed by the machine, further causes the machine to perform testing for the second bus master by:
   attempting to enable the second bus master;
   asserting a system reset signal;
   detecting whether a configuration cycle to the second bus master completes successfully.

* * * * *

UNITED STATES PATENT AND TRADEMARK OFFICE
CERTIFICATE OF CORRECTION

PATENT NO. : 6,438,686 B1
DATED : August 20, 2002
INVENTOR(S) : Daughtry et al.

It is certified that error appears in the above-identified patent and that said Letters Patent is hereby corrected as shown below:

Column 5,
Line 9, before "indicated", delete "20".

Signed and Sealed this

Seventh Day of September, 2004

JON W. DUDAS
*Director of the United States Patent and Trademark Office*